United States Patent
Werner et al.

(10) Patent No.: US 11,044,855 B2
(45) Date of Patent: Jun. 29, 2021

(54) ENVIRONMENTAL SCANNING AND TREE CUTTING GUIDANCE

(71) Applicant: International Business Machines Corporation, Armonk, NY (US)

(72) Inventors: John S. Werner, Fishkill, NY (US); Robert K. Overton, Olivebridge, NY (US); Noah B. Singer, White Plains, NY (US); Arkadiy O. Tsfasman, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 188 days.

(21) Appl. No.: 16/152,567

(22) Filed: Oct. 5, 2018

(65) Prior Publication Data

US 2020/0107505 A1    Apr. 9, 2020

(51) Int. Cl.
*A01G 23/08* (2006.01)
*G05B 15/02* (2006.01)

(52) U.S. Cl.
CPC ............. *A01G 23/08* (2013.01); *G05B 15/02* (2013.01)

(58) Field of Classification Search
CPC ...... A01G 23/00; A01G 23/003; A01G 23/02; A01G 23/08; A01G 23/091; A01G 23/093; A01G 23/095; A01G 23/099
USPC .......................................... 254/93 R, 89 HP
See application file for complete search history.

(56) References Cited

U.S. PATENT DOCUMENTS

| | | | | |
|---|---|---|---|---|
| 2,960,309 | A | * | 11/1960 | Swanson ............ A01G 23/099 254/133 R |
| 3,014,696 | A | | 12/1961 | Trott |
| 3,548,899 | A | | 12/1970 | Emerson |
| 3,848,648 | A | | 11/1974 | Dika |
| 4,314,592 | A | | 2/1982 | Silvey |
| 7,708,037 | B2 | * | 5/2010 | Smith ...................... B66F 3/08 144/34.2 |
| 2013/0240086 | A1 | * | 9/2013 | Santucci ............ A01G 23/099 144/34.1 |
| 2019/0090437 | A1 | * | 3/2019 | Lennings ............ A01G 23/099 |

FOREIGN PATENT DOCUMENTS

| | | |
|---|---|---|
| CA | 2330979 A1 | 8/2001 |
| DE | 202011107138 U1 | 5/2012 |
| EP | 1792535 A1 | 6/2007 |
| WO | 2017167793 A1 | 10/2017 |

* cited by examiner

*Primary Examiner* — Matthew Katcoff
(74) *Attorney, Agent, or Firm* — Cantor Colburn LLP; Teddi Maranzano

(57) ABSTRACT

Embodiments include method, systems, and computer program products for felling a tree. The method includes scanning, using a processor, a tree and an environment within a predetermined radius around the tree. The processor calculates an approximate center of gravity (CoG) for the tree in response to the scanning of the tree. The processor further receives a desired tree fall direction. The processor further provides attachment locations on the tree for attaching one or more tree felling assistance devices. The processor further instructs each of the one or more tree felling assistance devices to apply a first force to the tree in which the first force applied by each of the one or more tree felling assistance devices in conjunction with one or more cuts applied to the tree, fells the tree.

8 Claims, 9 Drawing Sheets

ENVIRONMENTAL SCANNING AND TREE CUTTING GUIDANCE

BACKGROUND

The present invention relates to landscaping, and more specifically, to implementing systems and processes for tree felling by providing guidance in consideration of an environment surrounding the tree.

Trees require regular pruning, trimming, and maintenance. When a tree dies or becomes diseased, it must be cut down in order to avoid human injuries and damage to nearby structures. While tree removal should be performed by seasoned arborist with years of experience, often property owners attempt to remove trees on their own leading to accidents which can cause injuries and destruction of property.

SUMMARY

Embodiments of the invention are directed to a method for felling a tree. A non-limiting example of the computer-implemented method includes scanning, using a processor, a tree and an environment within a predetermined radius around the tree. The processor calculates an approximate center of gravity (CoG) for the tree in response to the scanning of the tree. The processor further receives a desired tree fall direction. The processor further provides attachment locations on the tree for attaching one or more tree felling assistance devices. The processor further instructs each of the one or more tree felling assistance devices to apply a first force to the tree in which the first force applied by each of the one or more tree felling assistance devices in conjunction with one or more cuts applied to the tree, fells the tree.

Embodiments of the invention are directed to a computer program product that can include a storage medium readable by a processing circuit that can store instructions for execution by the processing circuit for performing a method for felling a tree. The method includes scanning a tree and an environment within a predetermined radius around the tree. The processor further calculates an approximate center of gravity (CoG) for the tree in response to the scanning of the tree. The processor further receives a desired tree fall direction. The processor further provides attachment locations on the tree for attaching one or more tree felling assistance devices. The processor further instructs each of the one or more tree felling assistance devices to apply a first force to the tree in which the first force applied by each of the one or more tree felling assistance devices in conjunction with one or more cuts applied to the tree, fells the tree.

Embodiments of the invention are directed to a system. The system can include a processor in communication with one or more types of memory. The processor can be configured to scan a tree and an environment within a predetermined radius around the tree. The processor can be configured to calculate an approximate center of gravity (CoG) for the tree in response to the scanning of the tree. The processor can be configured to receive a desired tree fall direction. The processor can be configured to provide attachment locations on the tree for attaching one or more tree felling assistance devices. The processor can be configured to instruct each of the one or more tree felling assistance devices to apply a first force to the tree in which the first force applied by each of the one or more tree felling assistance devices in conjunction with one or more cuts applied to the tree, fells the tree.

Additional technical features and benefits are realized through the techniques of one or more embodiments the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
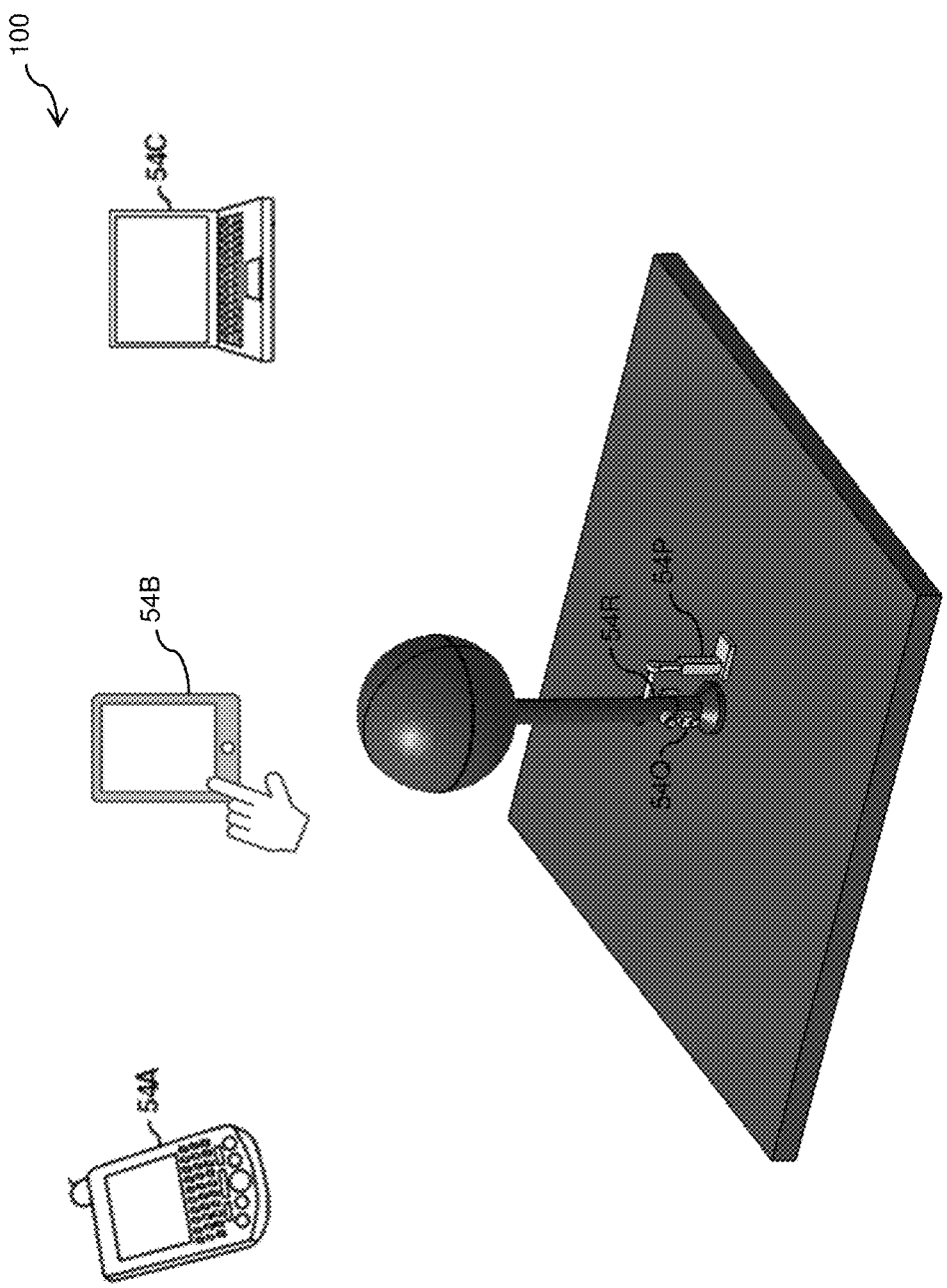
FIG. 1 is an exemplary diagram of a distributed data processing system in which exemplary aspects of the present invention may be implemented.

The diagrams depicted herein are illustrative. There can be many variations to the diagram or the operations described therein without departing from the spirit of the invention. For instance, the actions can be performed in a differing order or actions can be added, deleted, or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection".

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In accordance with exemplary embodiments of the disclosure, methods, systems, and computer program products for a post-merger/acquisition integration of systems and processes using a comparison, recommendation and migration tool is described herewith.

Turning now to an overview of technologies that are more specifically relevant to aspects of the invention, embodiments of the invention are related in general to tree felling systems and processes. An individual may desire to cut down a tree for a variety of reasons (e.g., the tree is dead, the tree is too close to a structure and could be a hazard based a given situation (weather), the tree is an obstruction (e.g., blocking solar panels). However, cutting down a tree poses several risks including injury to the user(s) performing the action, as well as causing damage to surrounding objects (e.g., houses, buildings, vehicles, etc.) due to the tree to falling in a bad direction. In addition, even if a user attempts to cause the tree to fall in a desired direction, the user may not be able to cause the tree to fall in the desired direction due to a weight distribution associated with the tree and/or may not know where to cut the tree to fell the tree in the desired direction.

Turning now to an overview of aspects of the present invention, one or more embodiments of the invention provide methods, systems, structures, and computer program products configured to fell a tree. A tree felling analyzer can scan the tree and an environment around the tree and notify a user of the possible directions for the tree to fall. The tree felling analyzer can receive a desired fall direction in response to the notification and instruct the user to attach one or more tree fall assistance devices on the tree at designated locations. The tree felling analyzer can instruct each of the attached one or more tree fall assistance devices to apply a calculated force to the tree, as well as monitor and adjust the force applied by each of the one or more tree fall assistance devices to assist the user in causing the tree to fall in the desired direction.

The above-described aspects of the invention address the shortcomings of the prior art by providing a map indicating possible tree fall directions and a determined rating associated with a possible tree fall directions. In addition, the user is provided with attachment locations to attach one or more tree fall assistance devices, which can be used to assist the user in causing the tree to fall in the desired direction. Accordingly, the aspects described herein provide a safer and more accurate technique to fell a tree.

FIG. 1 is a block diagram illustrating an operating environment 100 according to one or more embodiments of the present invention. The environment 100 can include one or more computing devices, for example, personal digital assistant (PDA) or cellular telephone (mobile device) 54A, tablet 54B, or computer 54C. The environment 100 can include one or more tree felling assistance devices, for example, pistons 54P, 54Q and 54R. The one or more computing devices can be used to control the one or more tree felling assistance devices when felling a tree.

Figure 2:
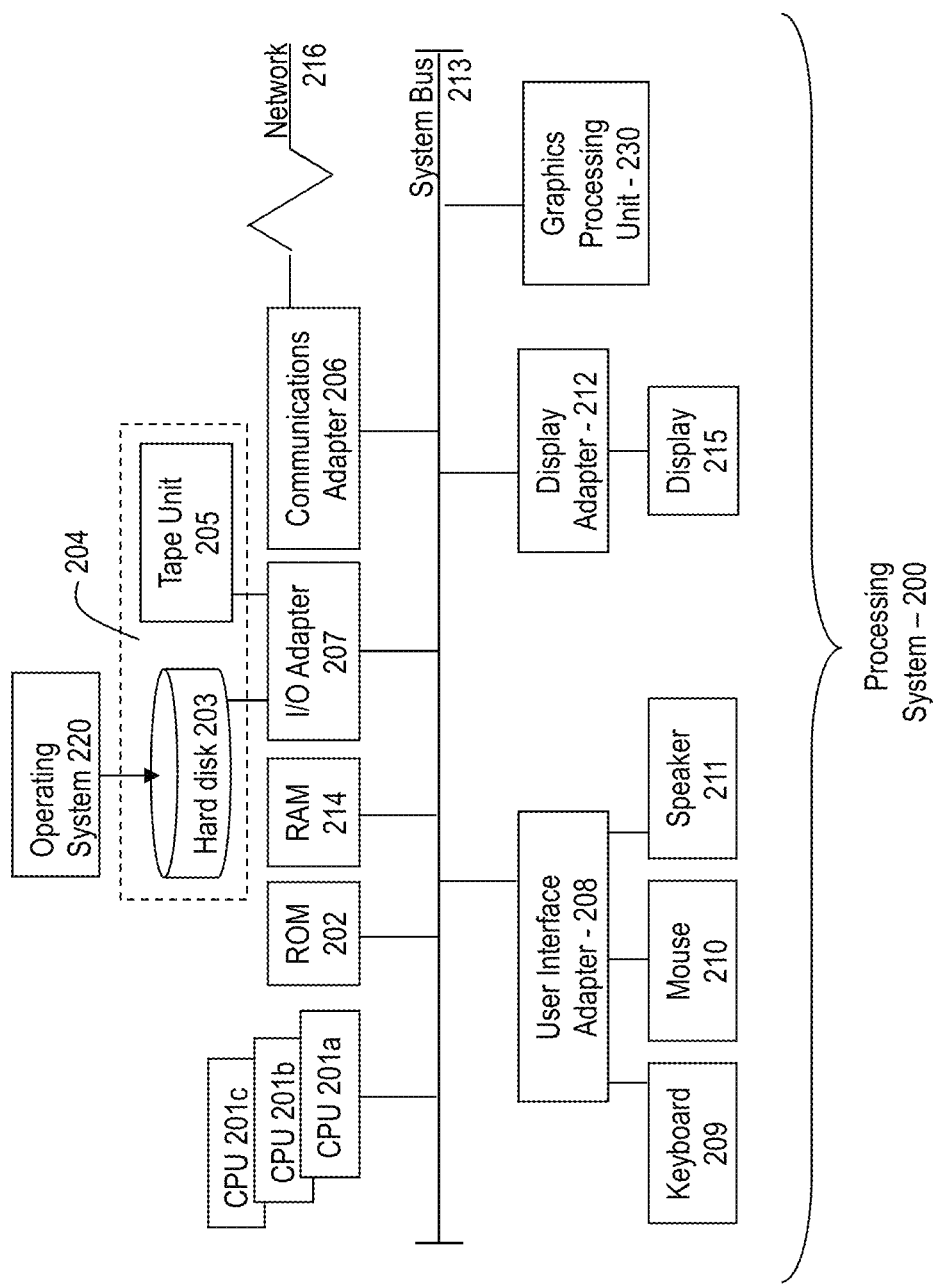
FIG. 2 is a block diagram illustrating one example of a processing system for practice of the teachings herein.

Referring to FIG. 2, there is shown an embodiment of a processing system 200 for implementing the teachings herein. The processing system 200 can form at least a portion of one or more computing devices, mobile device 54A, tablet 54B and computer 54C, as well as the tree felling assistance devices, pistons 54P, 54Q and 54R, which can be hydraulic pistons. In this embodiment, the processing system 200 has one or more central processing units (processors) 201a, 201b, 201c, etc. (collectively or generically referred to as processor(s) 201). In one embodiment, each processor 201 may include a reduced instruction set computer (RISC) microprocessor. Processors 201 are coupled to system memory 214 and various other components via a system bus 213. Read only memory (ROM) 202 is coupled to the system bus 213 and may include a basic input/output system (BIOS), which controls certain basic functions of the processing system 200.

FIG. 2 further depicts an input/output (I/O) adapter 207 and a network adapter 206 coupled to the system bus 213. I/O adapter 207 may be a small computer system interface (SCSI) adapter that communicates with a hard disk 203 and/or tape storage drive 205 or any other similar component. I/O adapter 207, hard disk 203, and tape storage device 205 are collectively referred to herein as mass storage 204. Operating system 220 for execution on the processing system 200 may be stored in mass storage 204. A network adapter 206 interconnects bus 213 with an outside network 216 enabling data processing system 200 to communicate with other such systems. A screen (e.g., a display monitor) 215 can be connected to system bus 213 by display adaptor 212, which may include a graphics adapter to improve the performance of graphics intensive applications and a video controller. In one embodiment, adapters 207, 206, and 212 may be connected to one or more I/O busses that are connected to system bus 213 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 213 via user interface adapter 208 and display adapter 212. A keyboard 209, mouse 210, and speaker 211 can all be interconnected to bus 213 via user interface adapter 208, which may include, for example, a Super I/O chip integrating multiple device adapters into a single integrated circuit.

In exemplary embodiments, the processing system 200 includes a graphics-processing unit 230. Graphics processing unit 230 is a specialized electronic circuit designed to manipulate and alter memory to accelerate the creation of images in a frame buffer intended for output to a display. In general, graphics-processing unit 230 is very efficient at manipulating computer graphics and image processing, and has a highly parallel structure that makes it more effective than general-purpose CPUs for algorithms where processing of large blocks of data is done in parallel.

Thus, as configured in FIG. 2, the processing system 200 includes processing capability in the form of processors 201, storage capability including system memory 214 and mass storage 204, input means such as keyboard 209 and mouse 210, and output capability including speaker 211 and display 215. In one embodiment, a portion of system memory 214 and mass storage 204 collectively store an operating system to coordinate the functions of the various components shown in FIG. 2.

Figure 3:
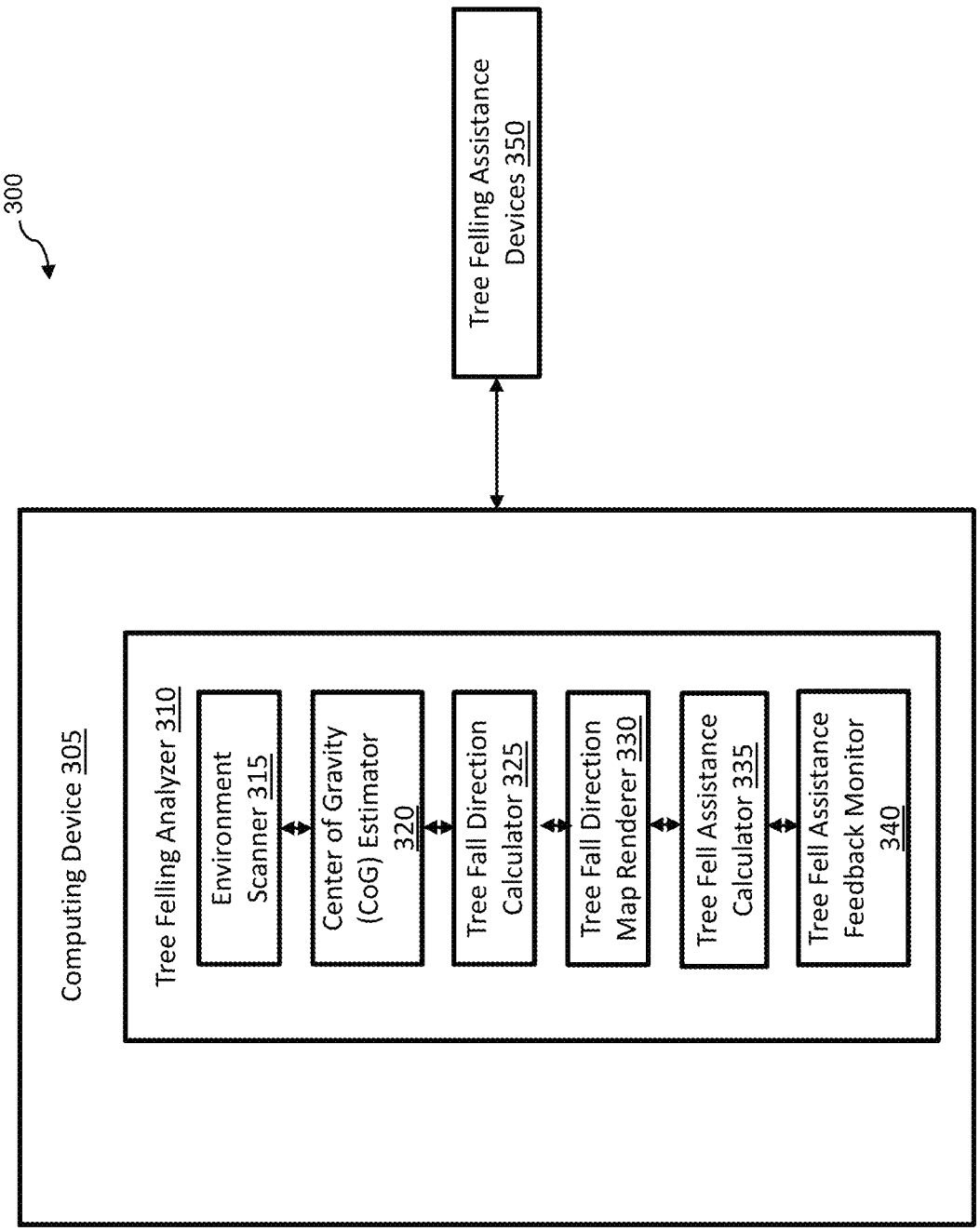
FIG. 3 is a block diagram illustrating a tree felling system according to one or more embodiments of the present invention.

FIG. 3 depicts a computing system 300 in accordance with one or more embodiments of the invention. The computing system 300 can be associated with one or more computing devices, for example, personal digital assistant (PDA) or cellular telephone (mobile device) 54A, tablet 54B, or computer 54C. As illustrated, the computing device 305 can include but is not limited to, a tree felling analyzer 310. The tree felling analyzer 310 can be used to assist a user in felling a tree in an optimal manner. The tree felling analyzer 310 can include an environment scanner 315, a center of gravity (CoG) estimator 320, a tree fell direction calculator 325, a tree fell direction map renderer 330, a tree fell assistance calculator 335, and a tree fell assistance feedback monitor 340.

The environment scanner 315 can be used to scan a tree desired to be cut down (fell), as well as a predetermined area surrounding the tree. The predetermined area can be based on the height of the tree. The environment scanner 315 can employ a one or more cameras or Lidar based system. From the scan, the following information can be extracted: size of the tree to be cut (user may have to select/outline the desired tree), objects in proximity to the tree (e.g., houses, cars, fencing, roads or any other structures or features), distance of each object to the tree and an identification of surrounding objects and their importance (e.g., a vehicle may be determined to have more importance than a lawn chair). The tree and extracted objects can be identified utilizing trained visual recognition software (e.g., IBM Watson's Visual Recognition API). The computing system 300 may be trained with images of different types of trees from multiple angles and their associated weights and center of gravity along with images of common objects that may be near trees and their associated risk factor. Accordingly, the environment scanner 315 can be used to obtain an accurate representation of the tree and any objects, which can be used to render the tree and an environment associated with the tree.

The CoG estimator 320 can be used to estimate a center of gravity for the tree (i.e., the point through which the force of gravity acts on the tree). The CoG estimation can be based on data received from the environment scanner 315, as well as data received from a user about the tree. The user can also provide information related to the tree, for example, tree type, age, etc. In addition, the CoG estimator 320 can approximate a weight and center of mass (CoM) for the tree based on tree size, tree type, canopy size, age, tilt angle, etc. The CoG estimator 320 can also receive force measurements from one or more tree felling assistance devices 350 to more accurately approximate a weight and CoM for the tree.

The tree fell direction calculator 325 can be used to calculate possible directions of where the tree may fall when cut based on the CoG estimation and to determine the risk for felling in the identified possible directions. For example, the tree fell direction calculator 325 can employ a point system which can be used to rate directions for tree felling based on the available free space and identified objects found during the scan taking into account an overall size and shape of the tree. The tree fall direction calculator 325 can also provide predictions on whether the tree will roll when after being felled, which can affect the points assigned to certain directions. In an exemplary point scheme, a direction having a highest score can be specified as the ideal direction for tree felling. Other directions can have a lower score, but may still be a suitable direction for tree felling. In addition, other directions can have low scores indicating that the associated directions are not suitable for tree felling (e.g., a house, car or other object of value is located in this direction).

The tree fall direction map renderer 330 can use the CoG estimation and directional scoring to generate a representation of the tree along with a representation of the directional scoring associated with the tree, which can be rendered for viewing by the user. Accordingly, the user can use the visualization to determine which direction is desired for tree felling.

The tree fell assistance calculator 335 can be used to calculate locations on the tree to attach tree felling assistance devices 350, e.g., pistons 54P, 54Q and 54R. The tree fell assistance calculator 335 can also use the CoG estimation and input indicating the desired direction for tree felling to calculate an estimated amount of force (push or pull) to be applied by each of the tree felling assistance devices 350 to cause the tree to fall in the desired direction during the tree felling process.

The computing device 305 can communicate the estimated amount of force to be applied by each of the tree felling assistance devices 350 to each of the tree felling assistance devices 350 using any suitable wired or wireless communications protocols, for example, wireless local area network (WLAN) (such as Wi-Fi) radio, ZigBee, Bluetooth, and/or a wireless network radio, such as a radio capable of communication with a wireless communication network such as a Long Term Evolution (LTE) network, WiMAX network, 3G network, etc. The tree fell assistance feedback monitor 340 can receive feedback information from each of the tree felling assistance devices 350, which can be used to determine whether the estimated amount of force for any of the tree felling assistance devices 350 should be adjusted due to CoG estimations or user input being incorrect. Accordingly, the computing device 305 can provide force application adjustments to any of the tree felling assistance devices 350 in response to the received feedback information.

Figure 4:
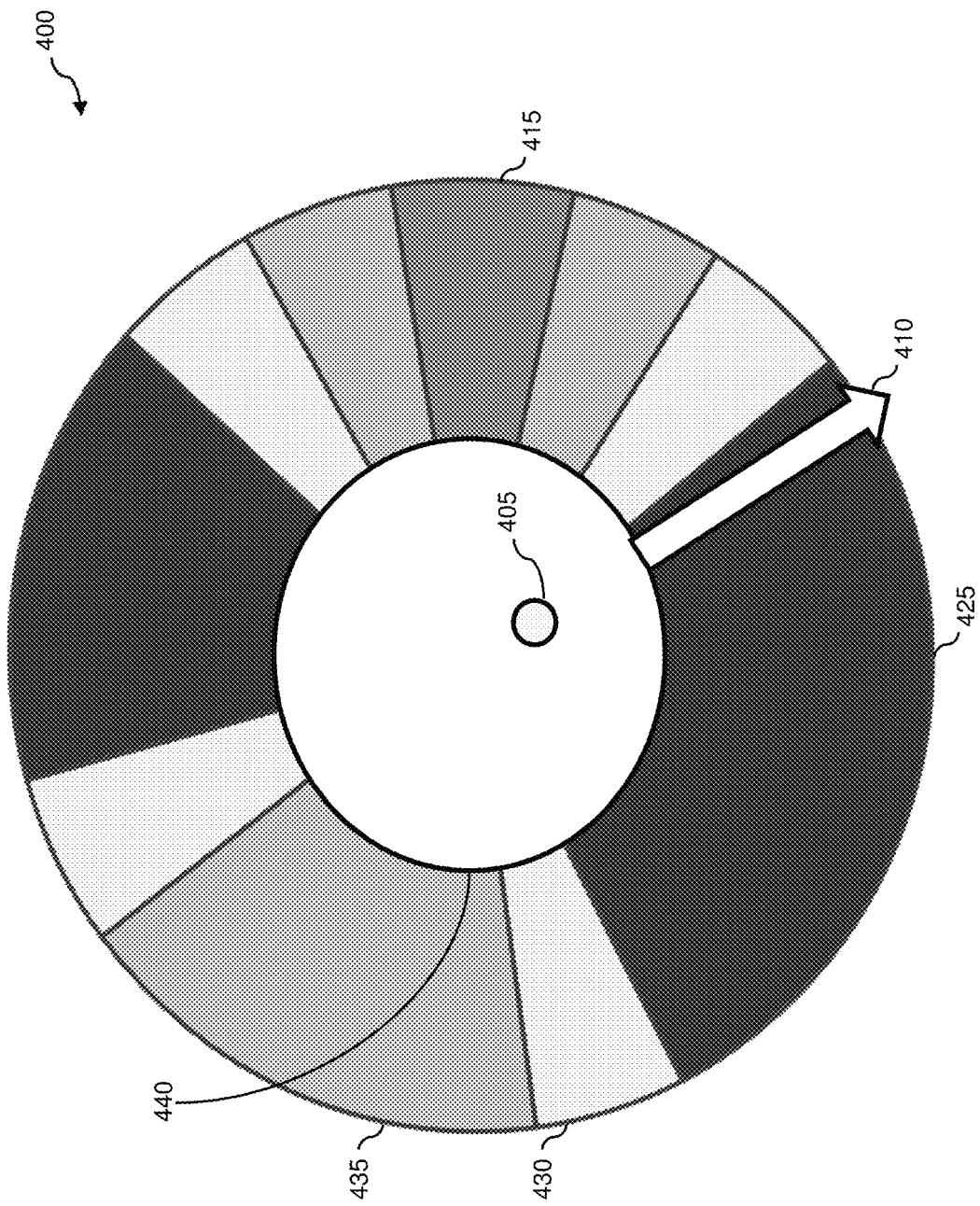
FIG. 4 illustrates an exemplary rendering of a representation for a tree along with a tree fall directional scoring associated with the tree according to one or more embodiments of the present invention.

FIG. 4 is an exemplary rendering 400 of a representation for a tree along with a tree fall directional scoring associated with the tree according to one or more embodiments of the present invention. The rendering 400 can indicate a cross-section of the tree 440 at a level that the tree felling assistance devices 350 can be attached, as well as an estimated center of gravity (CoG) location 405 on the tree. The rendering 400 can also indicate a calculated tree fall direction 410 based on the estimated CoG location 405. The rendering 400 can also utilize information from a scan of the tree, as well as a predetermined area surrounding the tree to visually indicate (e.g. color representations) tree fell directions that are for example, ideal 415, good 435, acceptable 430, and/or bad 425. Accordingly, based on the estimated CoG location 405 for the tree 440 in the example shown, the calculated tree fall direction without providing additional tree felling assistance results in the tree falling in the bad direction 425.

Figure 5:
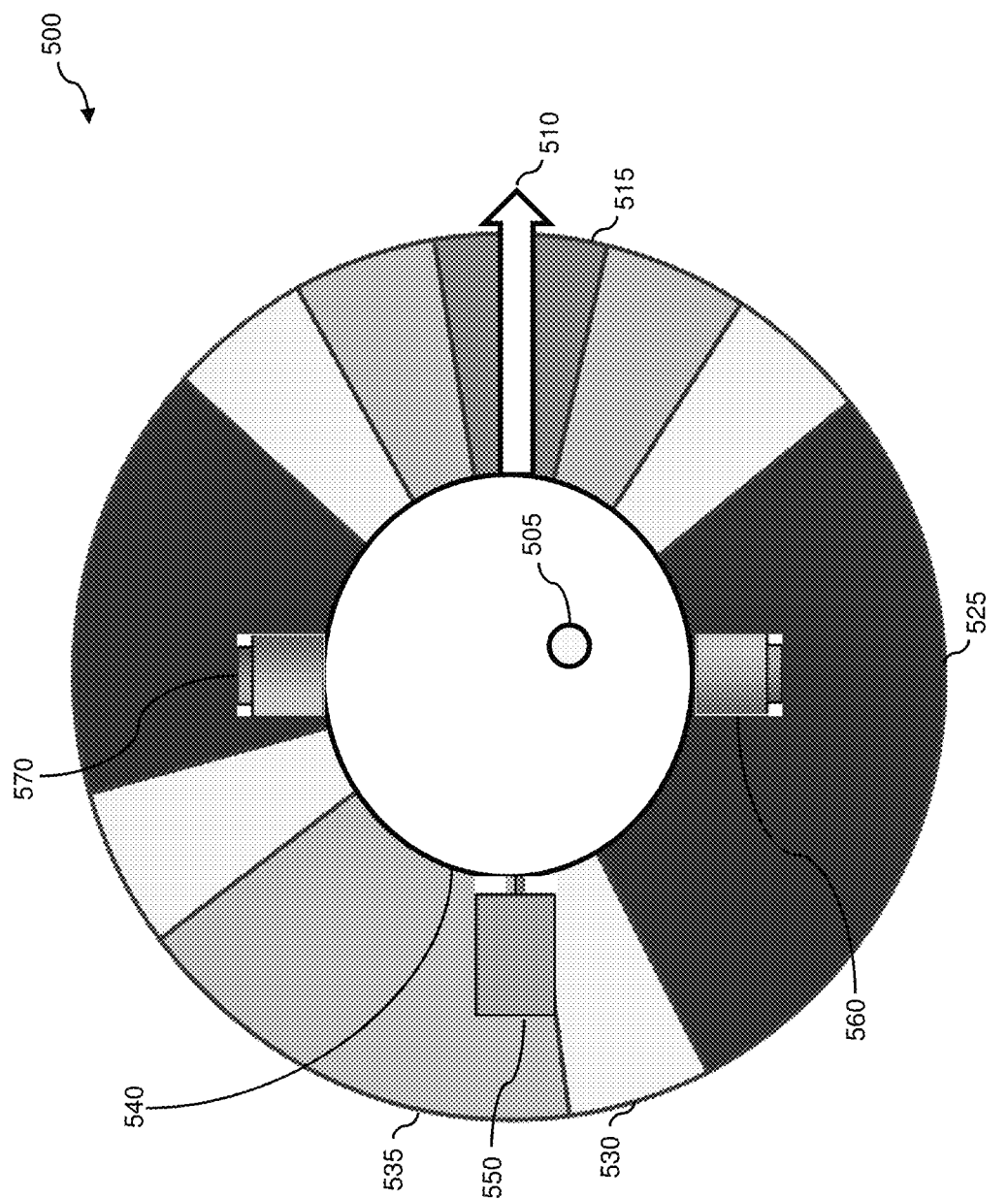
FIG. 5 illustrates an exemplary rendering of a representation for a tree with one or more tree felling assistance devices attached along with a representation of the directional scoring associated with the tree according to one or more embodiments of the present invention.

FIG. 5 is an exemplary rendering 500 of a representation for a tree with one or more tree felling assistance devices attached, along with a representation of the directional scoring associated with the tree according to one or more embodiments of the present invention. The rendering 500 can indicate the tree 440 cross-section, as well as an estimated center of gravity (CoG) location 405 on the tree. The rendering 500 can also indicate a calculated tree fall direction 510 based on the estimated CoG location 405 and calculated forces to be applied by the one or more tree felling assistance devices (e.g., 54P, 54R, and 54Q). The rendering 500 can also utilize information from a scan of the tree, as well as a predetermined area surrounding the tree to visually indicate tree fell directions that are for example, ideal 415, good 435, acceptable 430 and/or bad 425. By utilizing the one or more tree felling assistance devices, the calculated tree fall direction can be changed from the bad direction 425 (See FIG. 4) to an ideal direction 415. A tree fell assistance calculator can be used to determine a force to be applied to the tree 440 by each of the attached tree felling assistance devices to cause the tree 440 to fall in the ideal direction 415.

Figure 6:
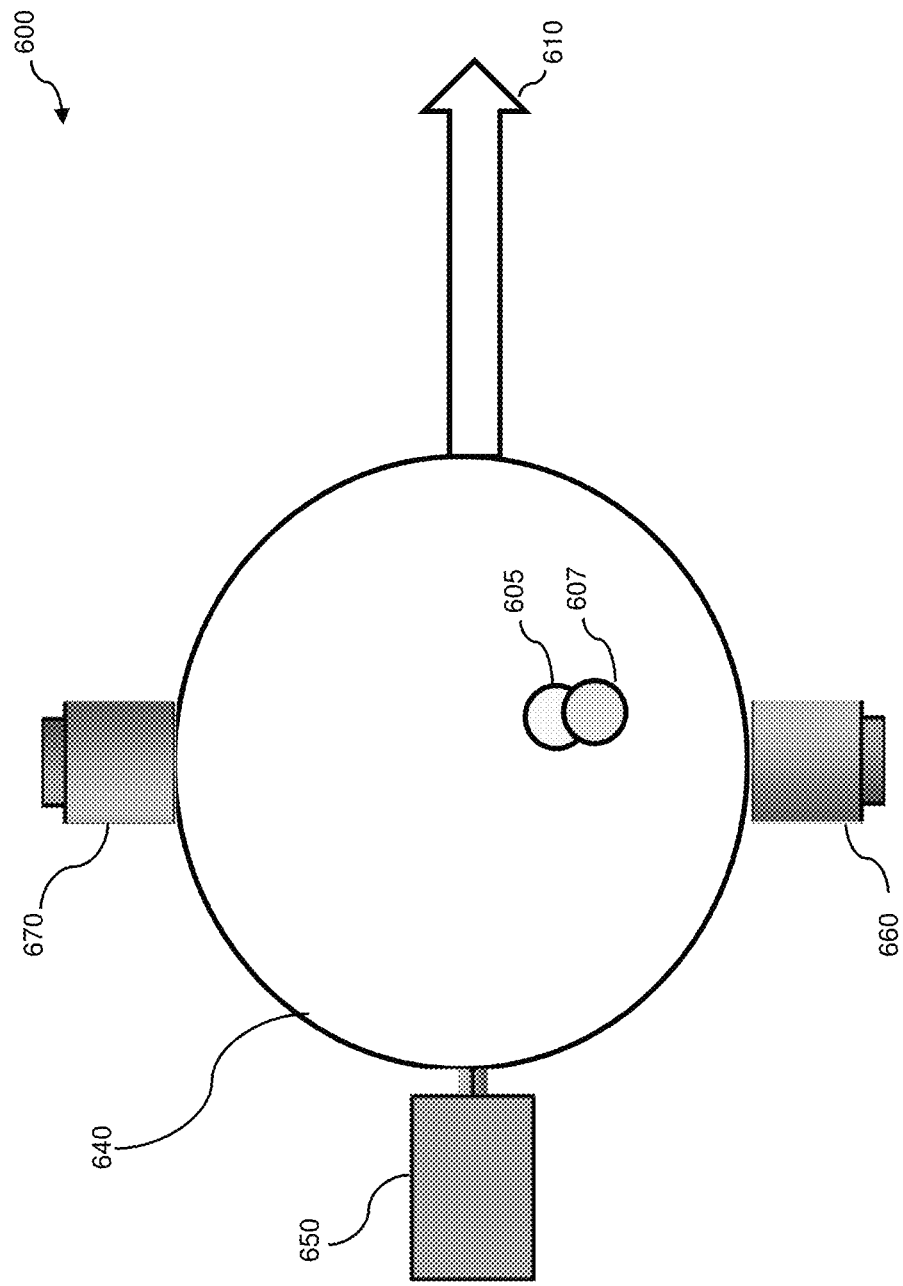
FIG. 6 illustrates an exemplary representation for a tree with one or more tree felling assistance devices attached according to one or more embodiments of the present invention.

FIG. 6 is an exemplary illustration 600 of a representation for a tree with one or more tree felling assistance devices attached according to one or more embodiments of the present invention. The illustration 600 can indicate the tree 440, as well as an estimated center of gravity (CoG) location 405 on the tree without assistance of the tree felling assistance devices, and a revised CoG location 607 based on an initial application of force by the one or more tree felling assistance devices (e.g., 54P, 54R, and 54Q). A tree fell assistance calculator can be used to calculate a force to be applied to the tree 440 by each of the attached tree felling devices to cause the tree 440 to fall in the ideal direction 415. In response to feedback data received from the one or more tree felling assistance devices (e.g., a measured deflection in response to a force applied by each of the one or more tree felling devices), the revised CoG location 607 can be calculated and a revised force applied by each of the one or more tree felling assistance devices can be adjusted based on the revised CoG location 607 thereby producing a tree falling direction 510 for the tree 440.

Figure 7:
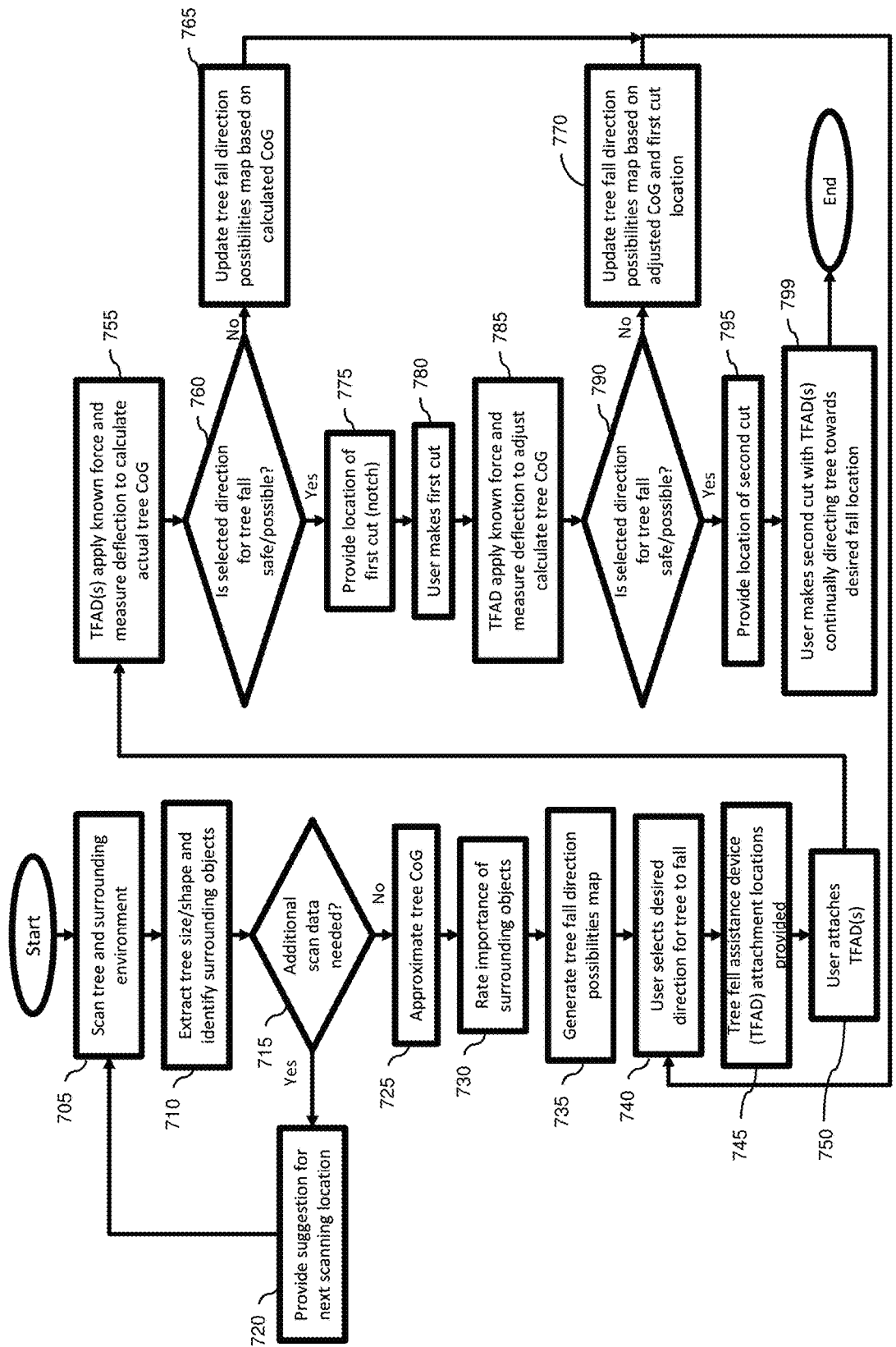
FIG. 7 is a flow diagram illustrating a method for felling a tree according to one or more embodiments of the present invention.

FIG. 7 is a flow diagram 700 illustrating a computer-implemented method for felling a tree according to one or more embodiments of the present invention. At block 705, the computer-implemented method scans a tree desired to be felled, as well as an environment within a predetermined radius of the tree. A user may be requested to move a camera or scanning device used to conduct the scan one or more times during the scan due to objects blocking the view of other objects within a predetermined radius of the tree. At block 710, a tree size, shape, and features can be identified, as well as any objects (e.g., houses, trees, cars, roads, etc.) within the scanned environment. At block 715, the computer-implemented method can determine whether additional scans are needed to create an accurate representation of the tree and the surrounding environment. If additional scans are needed, the computer-implemented method proceeds to block 720, where the computer-implemented method can provide one or more suggested scanning locations of the tree and/or the surrounding environment for additional scanning. If additional scans are not needed, the computer-implemented method proceeds to block 725, where the computer-implemented method can calculate an estimated center of gravity (CoG) for the tree.

At block 730, the computer-implemented method can assign a level of importance to each of the identified objects within the scanned environment. For example, a house can be assigned a highest level of importance, while a fence can be assigned an intermediate level of importance and another tree can be assigned low level of importance. At block 735, the computer-implemented method can generate a tree fall direction map including a representation for a tree along with a representation of a tree fall directional scoring associated with the tree (detailed further with reference to FIG. 8). At block 740, a user can view the tree fall direction map and select a desired tree fall direction based on the tree fall directional scoring.

At block 745, the computer-implemented method can provide the user with locations on the tree in which one or more tree felling assistance devices should be attached. At block 750, the user can attach the one or more tree felling assistance devices at the locations provided by the computer-implemented method. At block 755, the computer-implemented method can communicate with the one or more tree felling assistance devices to cause each of the one or more tree felling assistance devices to apply a known force to the tree. In addition, the one or more tree felling assistance devices can provide feedback information (e.g., information related to measured deflection in response to a known force applied to the tree). The feedback information can be used to adjust the approximated CoG that was provided at block 725, if necessary.

At block 760, the computer-implemented method can determine whether the user selected direction for the tree to fall is possible and/or able to be conducted in a safe manner based on the feedback information. For example, the one or more of the tree felling assistance devices may not be able to apply a force sufficient to overcome the CoG for the tree to cause the tree to fall in the user selected direction. If the user selected direction for the tree to fall is not possible or is not able to be conducted in a safe manner, the computer-implemented method proceeds to block 765 where the tree fall direction map can be updated based on the calculated CoG and subsequently returns to block 740.

If the user selected direction for the tree to fall is possible and able to be conducted in a safe manner, the computer-implemented method proceeds to block 775 where the user can be provided with a location to conduct a first cut (i.e., notch) to the tree. At block 780, the user can create the notch in the tree. At block 785, each of the one or more of the tree felling assistance devices can apply a known force, which may be different from the known force applied at block 755, to the tree based on the received feedback information in order to make adjustments to the CoG which may have shifted due to the first cut. At block 790, the computer-implemented method can determine whether the user selected direction for the tree to fall is possible and/or able to be conducted in a safe manner (i.e., the computer-implemented method can determine whether the first cut has shifted the CoG towards the desired fall direction selected by the user as expected). If the user selected direction for the tree to fall is not possible or is not able to be conducted in a safe manner, the computer-implemented method proceeds to block 770 where the tree fall direction map can be updated based on the adjusted CoG and the notch created by the user. The computer-implemented method subsequently returns to block 740. If the user selected direction for the tree to fall is possible and able to be conducted in a safe manner, the computer-implemented method proceeds to block 795 where the computer-implemented method can provide the user with a location to conduct a second cut to the tree. At block 799, the user can create the second cut in the tree while each of the one or more of the tree felling assistance devices can apply a force to the tree in order to fell the tree in the direction selected by the user (detailed further with reference to FIG. 9).

Figure 8:
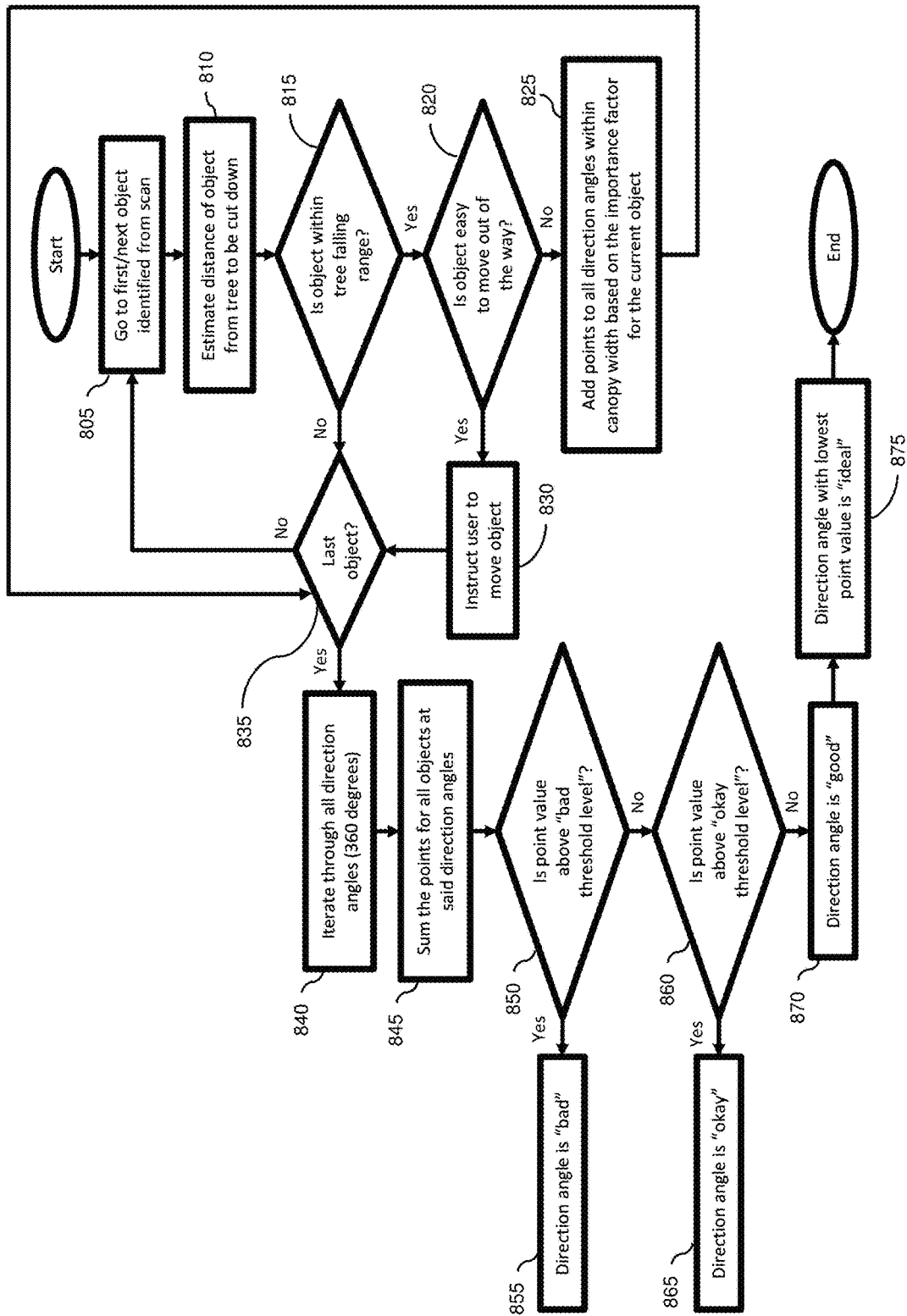
FIG. 8 is a flow diagram illustrating a method for generating a tree fall direction map according to one or more embodiments of the present invention.

FIG. 8 is a flow diagram 800 illustrating a computer-implemented method for generating a tree fall direction map according to one or more embodiments of the present invention. At block 805, the computer-implemented method can identify objects scanned within a predetermined radius of a tree, which can include an iterative process used for further analysis of each identified object. At block 810, the computer-implemented method can calculate an estimated distance from the tree for each identified object. The computer-implemented method can compare the distance information associated with each identified object with height information associated with the tree to determine whether each object is within a falling range of the tree, as shown at decision block 815.

If the object is within the tree falling range of the tree, the computer-implemented method proceeds to block 820 where the computer-implemented method determines whether the object is an object that can be easily moved (e.g., a car). If the object is an object that can be easily moved, the computer-implemented method proceeds to block 830 where a user can be instructed to move the object. The instruction can include a minimum safe distance for moving the object. The computer-implemented method would then proceed to block 835. If the object is an object that cannot be easily moved, the computer-implemented method proceeds to block 825 where the computer-implemented method can obtain an object score for the object and add points to all direction angles within a canopy width of the tree based on the importance factor for the current object. The computer-implemented method would then proceed to block 835.

At block 835, the computer-implemented method can determine whether the object is the last object identified from the scan or if another iteration needs to be completed to obtain information about additional objects. If the object is not the last object, the computer-implemented method returns to block 805.

If the object is the last object, the computer-implemented method proceeds to block 840 where the computer-implemented method can iteratively analyze each fall direction in a 360 degree circle around the tree. At block 845, the computer-implemented method can sum points for all objects for direction angles around the tree. At block 850, the computer-implemented method can determine whether the summed points associated with the direction angles are above a bad direction threshold. If the summed points are above the bad direction threshold for one or more direction angles, the computer-implemented method proceeds to block 855 where computer-implemented method can designate the associated direction angles as "bad".

If the summed points are not above the bad direction threshold, the computer-implemented method proceeds to block 860 where the computer-implemented method can determine whether the summed points associated with the direction angles are above an "okay direction threshold". If the summed points are above the okay direction threshold for one or more direction angles, the computer-implemented method proceeds to block 865 where computer-implemented method can designate the associated direction angles as "okay". If the summed points are not above the okay direction threshold, the computer-implemented method proceeds to block 870 where computer-implemented method can designate the associated direction angles as "good". At block 875, the computer-implemented method can designate a direction angle having the lowest score as an ideal direction for the tree felling.

Figure 9:
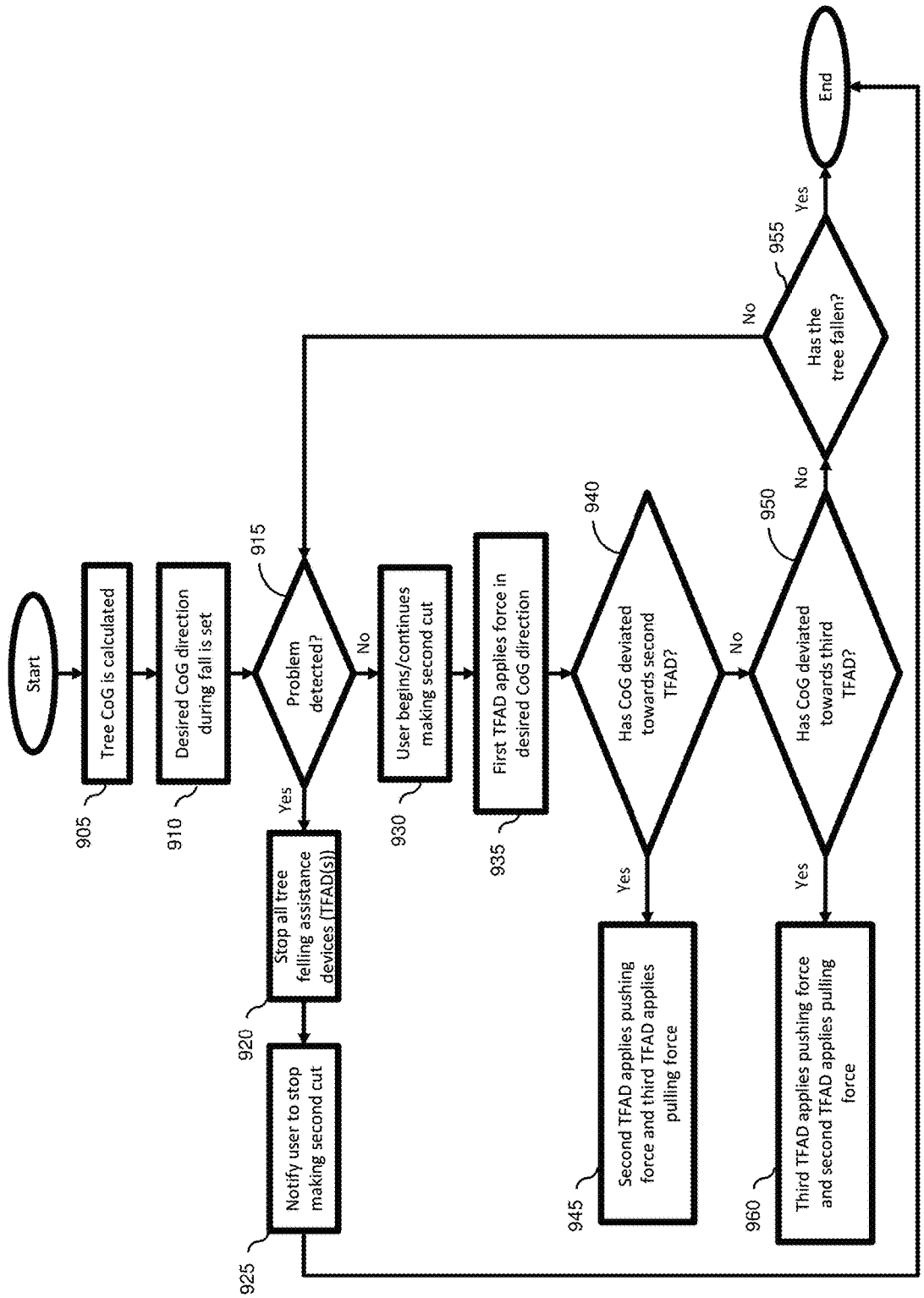
FIG. 9 is a flow diagram illustrating a method for operating a plurality of tree felling assistance devices according to one or more embodiments of the present invention.

FIG. 9 is a flow diagram 900 illustrating a computer-implemented method for operating a plurality of tree felling assistance devices according to one or more embodiments of the present invention. At block 905, the computer-implemented method can calculate a center of gravity (CoG) for a tree. At block 910, the computer-implemented method can determine a desired path for the CoG to follow from a starting position (calculated at block 905) towards the desired tree felling direction. The plurality of tree felling assistance devices, for example, three hydraulic pistons, can be attached to the tree at various locations on the tree and each can apply a force to the tree to cause the tree to follow the desired path such that the tree falls in the selected tree falling direction. At block 915, the computer-implemented method can determine whether a problem has been encountered by the plurality of tree felling assistance devices. For example, an initial application of force by the plurality of tree felling assistance devices can indicate that felling the tree in the selected tree falling direction is not possible or cannot be completed in a safe manner.

If a problem has been encountered, the computer-implemented method proceeds to block 920 where the computer-implemented method can cause each of the plurality of tree felling assistance devices to stop the application of force to the tree. At block 925, the user can be informed to not make a second cut to the tree or stop the second cut to the tree.

If a problem has not been encountered, the computer-implemented method proceeds to block 930 where the computer-implemented method instructs the user to make a second cut to the tree or continue the second cut to the tree. At block 935, a first tree felling (e.g., tree felling assistance device 54P) assistance device is instructed to apply a force in the selected tree felling direction.

At block 940, the computer-implemented method can determine whether the CoG has shifted away from the desired CoG path towards a location associated with a second tree felling assistance device attached to the tree due to the second cut and the application of force by the first tree felling device. If the CoG has shifted towards the location associated with the second tree felling assistance device (e.g., tree felling assistance device 54Q), the computer-implemented method proceeds to block 945 where the second tree felling assistance device can be instructed to apply a determined pushing force to the tree and a third tree felling assistance device (e.g., tree felling assistance device 54R), attached to the tree can be instructed to apply a determined pulling force to the tree.

If the CoG has not shifted towards the location associated with the second tree felling assistance device due to the application of force by the first tree felling device, the computer-implemented method proceeds to block 950 where the computer-implemented method can determine whether the CoG has shifted away from the desired CoG path towards a location associated with the third tree felling assistance device attached to the tree due to the second cut and the application of force by the first tree felling device. If the CoG has shifted towards the location associated with the third tree felling assistance device, the computer-implemented method proceeds to block 960 where the third tree felling assistance device can be instructed to apply a determined pushing force to the tree and the second tree felling assistance device attached to the tree can be instructed to apply a determined pulling force to the tree.

If the CoG has not shifted towards the location associated with the third tree felling assistance device due to the application of force by the first tree felling device, the computer-implemented method proceeds to block 955 where the computer-implemented method determines whether force applied by the first, second, and third tree felling assistance devices is sufficient to cause the tree to fall. If the tree has fallen, the computer-implemented method ends. If the tree has not fallen, the computer-implemented method returns to block 915.

Embodiments of the present invention can use Lidar or camera(s) to scan a tree and the environment and notify a user of possible directions to fell a tree. A desired tree fall direction can be received from the user and attachment locations for attaching hydraulic pistons to the tree can be provided based on the user selection. A first hydraulic piston can be attached directly opposite the desired fall direction. Second and third hydraulic pistons can be attached at angles (e.g., 90 degree) on opposite sides of the tree as compared to the first hydraulic piston.

Once attached, each of the pistons can provide a known force (e.g., 500 psi) during a first piston test to measure tree deflection. Based on the tree deflection measurements, a center of gravity (CoG) calculation can be updated and the selected tree felling direction can be checked to verify that initial predictions are correct and that the tree can fall in the desired direction. Once the CoG calculation update is complete and the selected direction of tree felling is verified, the user can be provided with a location to perform a first cut (notch) to the tree.

After the first cut is made, each of the pistons will again provide a known force in a second piston test and measure tree deflection. Based on the tree deflection measurements, the CoG calculation can be updated and the selected felling direction may be checked to verify that initial predictions are correct and the tree can be directed to fall in the desired direction. The user may then be provided with a location to perform a second cut to the tree in order to fell the tree. As the second cut is being made, the pistons may apply force and continually adjust the applied force based on sensor readings to direct the tree to fall in the desired location.

The pistons can remain attached to the tree using gimbaled connection points to account for instances in which the tree rolls or bounces when it falls. The pistons can include a release mechanism (e.g., electronic disconnect that can release the pistons and push them away from the direction of the falling tree to protect the pistons. In addition, tree felling progress can be constantly monitored and forces applied by each of the pistons during cutting can be adjusted (either manual or automated) to assist in causing the tree to fall in the desired direction.

Embodiments of the present invention can also employ a point system to rate directions for tree felling based on the available free space and identified objects found during a scan taking an overall size and shape of the tree into account. Predictions on whether a tree will roll when it falls can be considered and affect the points assigned to certain directions. Thresholds can be set to determine which tree felling directions are good (i.e., safe), okay (i.e., not the best directional choice, but still safe), or bad (i.e., unsafe). A direction with the lowest score may be specified as the ideal direction for tree felling.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for felling a tree, the method comprising:
    scanning, using a processor, a tree and an environment within a predetermined radius around the tree;
    calculating, using the processor, an approximate center of gravity (CoG) for the tree in response to the scanning of the tree;
    receiving, using the processor, a desired tree fall direction;
    providing, using the processor, attachment locations on the tree for attaching one or more hydraulic pistons to the tree;
    instructing, using the processor, each of the one or more hydraulic pistons to apply a first force to the tree;
    receiving, by the processor, feedback information from the hydraulic pistons;
    adjusting, by the processor, the approximate COG for the tree based on the feedback information;
    instructing, using the processor, each of the one or more hydraulic pistons to apply a revised force to the tree, wherein the revised force applied by each of the one or more hydraulic pistons, fells the tree.

2. The computer-implemented method of claim 1, further comprising extracting a tree size and shape and a location of one or more objects in the environment within the predetermined radius around the tree.

3. The computer-implemented method of claim 2, further comprising generating a tree fall direction map based on the extracted tree size and shape and the location of the one or more objects.

4. The computer-implemented method of claim 3, wherein receipt of desired tree fall direction is in response to a user selection based on the tree fall direction map.

5. The computer-implemented method of claim 1, further comprising determining that the desired tree fall direction is safe.

6. The computer-implemented method of claim 5, further comprising updating a fall direction map in response to the determination that the desired tree fall direction is not possible.

7. The computer-implemented method of claim 1, further comprising receiving deflection data from each of the one or more hydraulic pistons in response to the first force applied by each of the one or hydraulic pistons to the tree.

8. The computer-implemented method of claim 7, further comprising:
    calculating an adjusted CoG based on the received deflection data; and
    instructing each of the one or more hydraulic pistons to apply a second force to the tree.

\* \* \* \* \*